United States Patent [19]

Carbonaro et al.

[11] Patent Number: 5,003,286

[45] Date of Patent: Mar. 26, 1991

[54] BINARY MAGNITUDE COMPARATOR WITH ASYNCHRONOUS COMPARE OPERATION AND METHOD THEREFOR

[75] Inventors: Joseph Carbonaro; R. A. Garibay, Jr.; Richard Reis; Jesse R. Wilson, all of Austin, Tex.

[73] Assignee: Motorola, Inc., Schaumburg, Ill.

[21] Appl. No.: 390,556

[22] Filed: Aug. 7, 1989

[51] Int. Cl.⁵ .............................................. G06F 7/02
[52] U.S. Cl. .................................................. 340/146.2
[58] Field of Search ................ 340/146.2; 364/715.06

[56] References Cited

U.S. PATENT DOCUMENTS

| 3,609,703 | 9/1971 | Peacock ........................ | 340/146.2 |
| 4,841,279 | 6/1989 | Walters, Jr. ..................... | 340/146.2 |

Primary Examiner—Dale M. Shaw
Attorney, Agent, or Firm—Paul Polansky

[57] ABSTRACT

A binary magnitude comparator having a plurality of rows and a plurality of columns, including a most significant column and a least significant column. The binary magnitude comparator is not clocked and performs a comparison asynchronously in a shorter period of time than a clocked binary magnitude comparator of corresponding bit size. The binary magnitude comparator comprises a plurality of comparator cells forming a plurality of rows and columns. Each row corresponds to a register, and each column a bit position in that register. A comparison is begun by selecting one or more registers with a plurality of select signals coupled to comparator cells in the most significant column, and proceeds from the most significant column, to successively next most significant columns, and terminates when the comparison in the least significant column is complete. The result of the binary magnitude comparison is a first output signal representing a binary value of a highest-valued register, and a second output signal, indicating which row or rows had the highest value. The binary magnitude comparator is designed to operate with an arbitrary number of rows and columns.

7 Claims, 2 Drawing Sheets

BINARY MAGNITUDE COMPARATOR WITH ASYNCHRONOUS COMPARE OPERATION AND METHOD THEREFOR

FIELD OF THE INVENTION

This invention relates generally to digital circuits, and more particularly, to binary magnitude comparator circuits for performing comparisons of values of registers in a register set.

BACKGROUND OF THE INVENTION

Certain digital circuits, such as microprocessors, maintain register file sets for various purposes, such as general-purpose data registers. In a microcontroller, defined as an integrated circuit comprising a microprocessor and one or more peripherals, registers are maintained for numerous purposes such as to store interrupt levels assigned to several peripheral devices. The register set is an array of random access memory cells, with multiple rows and columns, in which each row corresponds to a register, and each column corresponds to a bit position in the registers.

A useful function a microcontroller may perform on a register file is a comparison of binary values stored in each register. A binary magnitude comparator performs this function by making a bit-by-bit comparison of the contents of two or more enabled registers in the register file. Results of the comparison are a highest or lowest binary value in the register file, and signals from each of the registers which indicate whether the register contained the highest or lowest binary value. For example, a register set may indicate an interrupt priority level for each of several peripherals. The result of the binary magnitude comparison is the highest interrupt level of all enabled peripherals, and a signal for each peripheral indicating whether the peripheral had the highest interrupt level.

A typical binary magnitude comparator checks for a maximum value in a register file by first comparing a most significant bit from each enabled register. The result of the comparison is sensed, and if any registers have a binary '1' in the most significant bit position, or column, the result is sensed as a '1' for that column. All registers having a '1' in the most significant column proceed to compare the next column after the next occurrence of a clock edge. If all registers have a binary '0' in the most significant column, all registers proceed to compare the next most significant column. The operation continues to next most significant columns until all bits are compared. Only those registers containing a highest value through a given column may continue the comparison to next most significant columns. When the operation is complete, a binary value representing the highest valued register or registers is provided, along with a signal for each register to indicate whether the highest binary value was found in the register. A binary magnitude comparator implemented in this fashion is inherently slow, however, because successive column comparisons must wait for succeeding clock pulses. Furthermore, different parts of the digital circuit may contain register sets of different register widths and include a different number of registers, requiring the binary magnitude comparator to be re-designed for each register set.

BRIEF DESCRIPTION OF THE INVENTION

Accordingly, it is an object of the present invention to provide a binary magnitude comparator with asynchronous operation and arbitrary size.

It is another object of the present invention to provide a binary magnitude comparator cell useful in a binary magnitude comparator with asynchronous operation and arbitrary size.

It is yet another object of the present invention to provide a method for comparing binary magnitudes between registers with improved speed.

In carrying out these and other objects of the invention, there is provided, in one form, a binary magnitude comparator cell for performing a comparison of a data output signal to a first logic state in response to an enable input signal. The binary magnitude comparator cell comprises a data storage portion, an enable carry portion, and an output drive portion. The data storage portion provides a data output signal in response to a logic state of a data input signal during a predetermined period. The enable carry portion is coupled to the data storage portion, and receives the enable input signal, the data output signal, and a feedback signal. The enable carry portion provides an enable carry signal at the first logic state if the enable input signal and either the data output signal or the feedback signal are at the first logic state. The output drive portion is coupled to the data storage portion, and receives the data output signal and the enable input signal. The output drive portion provides a compare output signal at a second logic state if the enable input signal and the data output signal each assume the first logic state, or at a high impedance state otherwise.

These and other objects, features and advantages will be more clearly understood from the following detailed description taken in conjunction with the accompanying drawings.

DETAILED DESCRIPTION OF THE INVENTION

Figure 1:
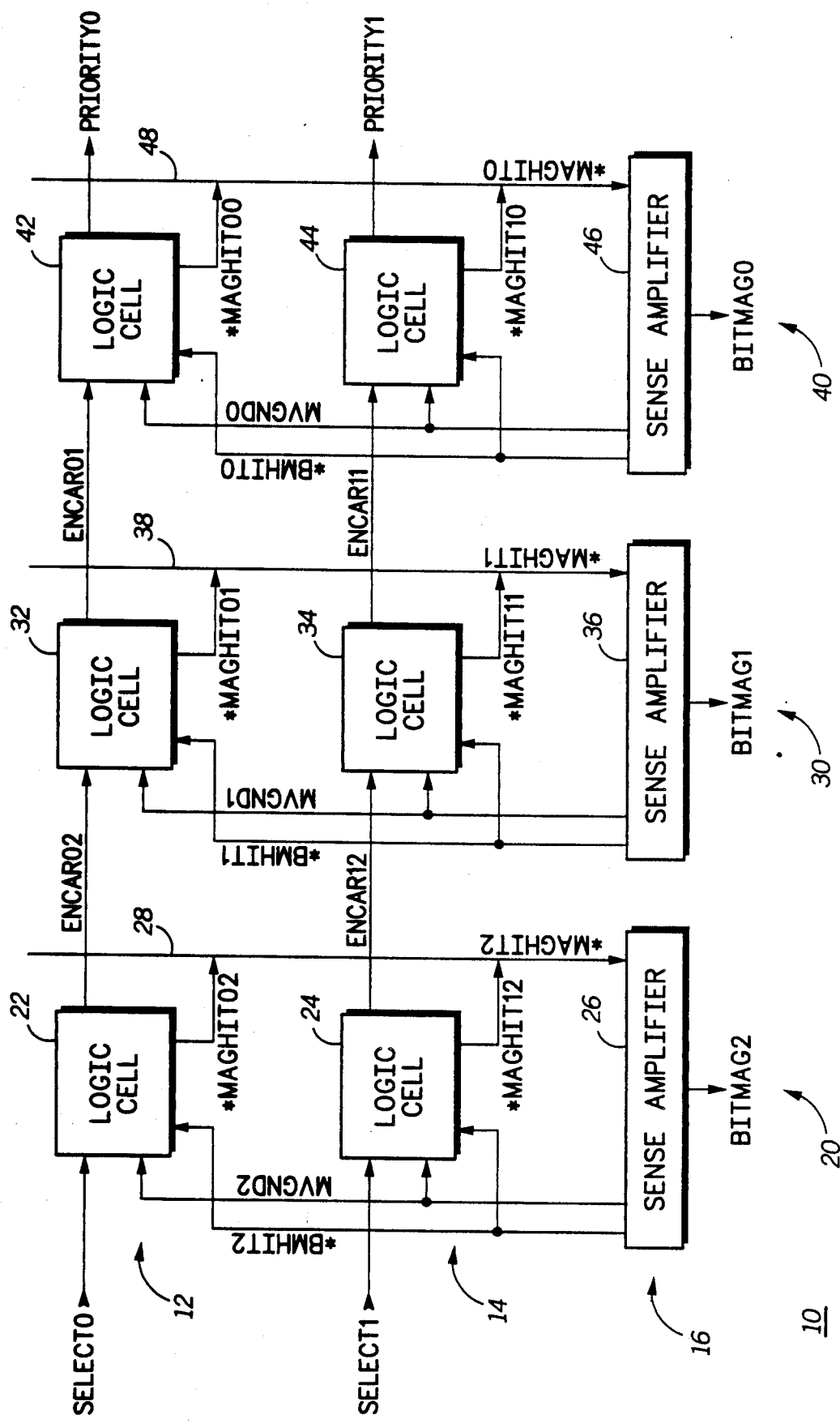
FIG. 1 illustrates in block diagram form a binary magnitude comparator in accordance with the present invention.

FIG. 1 illustrates in block diagram form a binary magnitude comparator 10 in accordance with the present invention. Comparator 10 has generally a first register 12, a second register 14, and a sense amplifier portion 16. Register 12 comprises a logic cell 22, a logic cell 32, and a logic cell 42, hereinafter referred to as cell 22, cell 32, and cell 42. Register 14 has a logic cell 24, a logic cell 34, and a logic cell 44, hereinafter referred to as cell 24, cell 34, and cell 44. Sense amplifier portion 16 has a sense amplifier 26 for receiving an output line 28, a sense amplifier 36 for receiving an output line 38, and a sense amplifier 46 for receiving an output line 48. Cell 22, cell 24, sense amplifier 26, and output line 28 collectively form column 20. Cell 32, cell 34, sense amplifier 36, and output line 38 collectively form column 30. Cell 42, cell 44, sense amplifier 46, and output line 48 collectively form column 40.

Cell 22 receives an enable input signal SELECT0, a ground signal MVGND2, and a feedback signal

*BMHIT2. Cell 22 provides an output signal *MAGHIT02 to output line 28 and provides an enable carry signal ENCAR02. An asterisk (*) in front of a signal designation indicates that the signal is active at a logic low. Cell 24 receives an enable input signal SELECT1, a ground signal MVGND2, and a feedback signal *BMHIT2. Cell 24 provides an output signal *MAGHIT12 to output line 28 and provides an enable carry signal ENCAR12. Cell 32 receives an enable input signal ENCAR02, a ground signal MVGND1, and a feedback signal *BMHIT1. Cell 32 provides an output signal *MAGHIT01 to output line 38 and provides an enable carry signal ENCAR01. Cell 34 receives an enable input signal ENCAR12, a ground signal MVGND1, and a feedback signal *BMHIT1. Cell 34 provides an output signal *MAGHIT11 to output line 38 and provides an enable carry signal ENCAR11. Cell 42 receives an enable input signal ENCAR01, a ground signal MVGND0, and a feedback signal *BMHIT0. Cell 42 provides an output signal *MAGHIT00 to output line 48 and provides an output signal PRIORITY0. Cell 44 receives an enable input signal ENCAR11, a ground signal MVGND0, and a feedback signal *BMHIT0. Cell 44 provides an output signal *MAGHIT10 to output line 48 and provides an output signal PRIORITY1.

Sense amplifier 26 is coupled to output line 28 and receives signal *MAGHIT2 on output line 28, and provides signal MVGND2, signal *BMHIT2, and signal BITMAG2. Sense amplifier 36 is coupled to output line 38 and receives signal *MAGHIT1 on output line 38, and provides signal MVGND1, signal *BMHIT1, and signal BITMAG1. Sense amplifier 46 is coupled to output line 48 and receives signal *MAGHIT0 on output line 48, and provides signal MVGND0, signal *BMHIT0, and signal BITMAG0.

In general operation, comparator 10 compares a value in a register of row 12, with a value in a register of row 14, and provides a three-bit binary value representing the highest value, where BITMAG2, BITMAG1, and BITMAG0 are the most, middle, and least significant bits, respectively. PRIORITY0 indicates whether the highest value was found in the register of row 12, and PRIORITY1 indicates whether the highest value was found in the register of row 14. If the register of row 12 contains the same value as the register of row 14, both PRIORITY0 and PRIORITY1 are asserted. The comparison begins with assertion of signals SELECT0 and SELECT1 and proceeds asynchronously from the most significant column, column 20, to a next most significant column, column 30, and finally to a least significant column, column 40. In a likewise fashion, column 30 is a next least significant column to column 40, and column 20 is a next least significant column to column 30.

SELECT0 and SELECT1 enable the registers of row 12 and 14, respectively, in a binary magnitude comparison operation. Assuming both SELECT0 and SELECT1 are true, comparator 10 performs the comparison as follows. If a bit stored in cell 22 is high, then cell 22 drives a low voltage on *MAGHIT02 relative to MVGND2 on output line 28. If the bit is low, then cell 22 drives *MAGHIT02 into a high impedance state. If a bit stored in cell 24 is high, then cell 24 drives a low voltage on *MAGHIT12 relative to MVGND2 on output line 28. If the bit is low, then cell 24 drives *MAGHIT12 into the high impedance state. *MAGHIT2 driven into sense amplifier 26 on output line 28 is an active low wired-OR signal, that assumes a low voltage or a true state if either cell 22 or cell 24 drives a low voltage on output line 28. If both cell 22 and cell 24 place *MAGHIT02 and *MAGHIT12 in the high impedance state, then *MAGHIT2 is pulled to a high voltage by a pullup in sense amplifier 26. Sense amplifier 26 provides MVGND2 as a ground reference for *MAGHIT02 and *MAGHIT12 when forming *MAGHIT2 on output line 28. Sense amplifier 26 also provides signal *BMHIT2 to cell 22 and cell 24. *BMHIT2 is active or true if a binary '1' was detected in any cell in column 20 by sense amplifier 26 by signal *MAGHIT2 being a low voltage. *BMHIT2 is a buffered signal with a logic state the same as *MAGHIT2. Cell 22 provides signal ENCAR02, which is true if SELECT0 is true and either a stored bit BIT02 was a binary '1' or *BMHIT2 is false, and is false otherwise, or

ENCAR02 = SELECT0·(BIT02 + *BMHIT2).

Cell 24 provides signal ENCAR12, which is true if SELECT1 is true and either stored bit BIT12 was a binary '1' or *BMHIT2 is false, and and is false otherwise, or

ENCAR12 = SELECT1·(BIT12 + *BMHIT2).

In column 30, cell 32 receives ENCAR02 as an enable signal, and provides *MAGHIT01 to output line 38 to indicate whether a stored bit is a binary '1', if enabled. Cell 32 provides signal ENCAR01, which is true if ENCAR02 is true and either the stored bit was a binary '1' or *BMHIT1 is false, and is false otherwise. Cell 34 receives ENCAR12 as an enable signal, and provides *MAGHIT11 to output line 38 to indicate whether a stored bit is a binary '1', if enabled. Cell 34 provides signal ENCAR11, which is true if ENCAR12 is true and either the stored bit was a binary '1' or *BMHIT1 is false, and is false otherwise.

In column 40, cell 42 receives ENCAR01 as an enable signal, and provides *MAGHIT00 to output line 48 to indicate whether a stored bit is a binary '1', if enabled. Cell 42 provides signal PRIORITY0, which is true if ENCAR01 is true and either the stored bit was a binary '1' or *BMHIT0 is false, and is false otherwise. Cell 44 receives ENCAR11 as an enable signal, and provides *MAGHIT10 to output line 48 to indicate whether a stored bit is a binary '1', if enabled. Cell 44 provides signal PRIORITY1, which is true if ENCAR11 is true and either the stored bit was a binary '1' or *BMHIT0 is false, and is false otherwise. PRIORITY0 and PRIORITY1, when set, indicate that the highest value was found in the register associated with row 12 or 14, respectively. If the register of row 12 and the register of row 14 have the same value, both PRIORITY0 and PRIORITY1 will be set.

The binary magnitude comparison operation proceeds asynchronously, limited only by the propagation delays through the circuitry and not dependent on any clocking signal. It should be apparent from the flow of the enable carry signals and the wired-OR signals that binary magnitude comparators could be constructed with an arbitrary number of columns and rows consistent with the present invention, subject only to technological limitations of the circuitry. For example, a limitation in the number of rows would occur as output lines to which wired-OR signals are connected increases the impedance of the output lines beyond drive capabilities of binary magnitude comparator cells contained in the rows.

Figure 2:
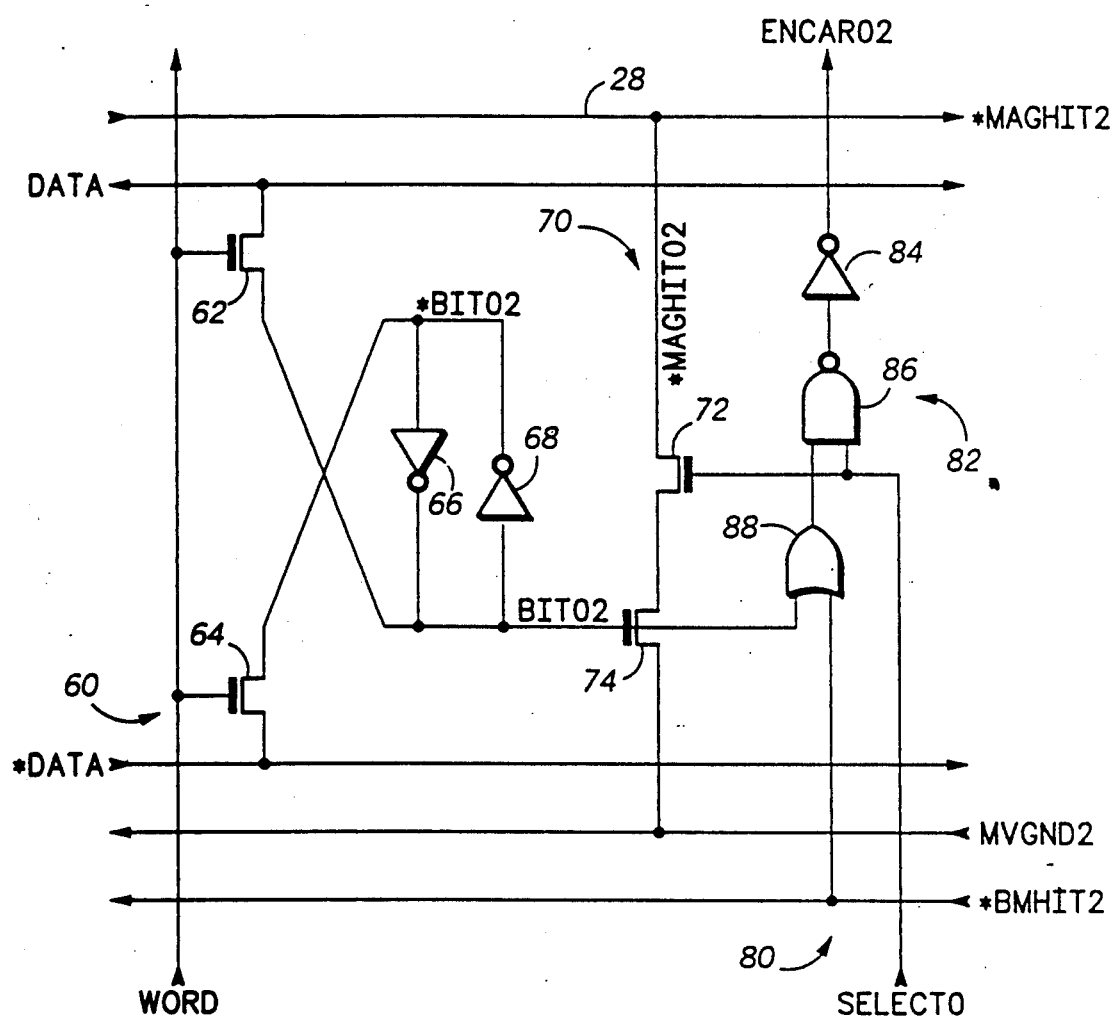
FIG. 2 illustrates in partial schematic form a binary magnitude comparator cell for use in the binary magnitude comparator of FIG. 1.

FIG. 2 illustrates in schematic form cell 22 of FIG. 1. Cell 22 has identical circuitry to cells 24, 32, 34, 42, and 44, and differs only in the input signals received and the output signals provided. Cell 22 comprises a data storage portion 60, an output drive portion 70, and an enable carry portion 80. Data storage portion 60 comprises an N-channel transistor 62, an N-channel transistor 64, an inverter 66, and an inverter 68. Output drive portion 70 comprises an N-channel transistor 72, and an N-channel transistor 74. Enable carry portion 80 comprises an AND gate portion 82, and an OR gate 88. AND gate portion 82 comprises an inverter 84, and a NAND gate 86.

In data storage portion 60, transistor 62 has a drain connected to a signal DATA, a gate connected to a signal WORD, and a source. Transistor 64 has a drain, a gate connected to WORD, and a source connected to a signal *DATA. Inverter 66 has an input terminal connected to the drain of transistor 64, and an output terminal connected to the source of transistor 62 and supplying signal BIT02. Inverter 68 has an input terminal connected to the output terminal of inverter 66, and an output terminal connected to the input terminal of inverter 66 and supplying signal *BIT02.

In output drive portion 70, transistor 72 has a drain connected to output line 28 and providing *MAGHIT02 thereto, a gate for receiving SELECT0, and a source. Transistor 74 has a drain connected to the source of transistor 72, a gate connected to the output terminal of inverter 66 and receiving signal BIT02, and a source connected to MVGND2. In enable carry portion 80, OR gate 88 has a first input terminal connected to the output terminal of inverter 66 for receiving signal BIT02, a second input terminal for receiving signal *BMHIT2, and an output terminal. NAND gate 86 has a first input terminal connected to the output terminal of OR gate 88, a second input terminal for receiving signal SELECT0, and an output terminal. Inverter 84 has an input terminal connected to the output terminal of NAND gate 86, and an output terminal for providing ENCAR02.

In operation, cell 22 outputs a signal *MAGHIT02 indicating whether BIT02 is a binary '1', if enabled by signal SELECT0. In addition, when enabled, cell 22 provides carry signal ENCAR02 to indicate that either BIT02 is a binary '1', or *BMHIT2 is false, indicating that no enabled cells in column 20 of FIG. 1 had a binary '1' in an enabled cell's data storage portion. Assume the WORD signal selects data storage portion 60. In a write mode, signals DATA and *DATA are complementary signals which provide data to be stored, and DATA and *DATA are driven strongly enough to overcome inverters 66 and 68, which provide a relatively weakly driven signal on BIT02 and *BIT02. When the WORD signal places data storage portion 60 in a write mode, inverters 66 and 68 latch a new data value supplied by DATA and *DATA. The output terminal of inverter 66 provides BIT02 to output drive portion 70 and enable carry portion 80. Data storage portion 60 may contain a read mode besides that provided by the output of inverter 66; however the read mode is optional and does not affect how cell 22 operates. It should be apparent that other forms of data storage portions, having a write mode and providing a stored bit, can be used.

Output drive portion 70 receives BIT02, enable signal SELECT0, and ground signal MVGND2, and provides signal *MAGHIT02 to output line 28 in response. *MAGHIT02 is a signal which is true when a voltage of *MAGHIT02 is a low voltage with respect to MVGND2, and is false when *MAGHIT02 is driven in a high impedance state. MVGND2 provides a negative power supply or ground voltage terminal from which *MAGHIT02 is referenced. If both SELECT0 and BIT02 are a high voltage, both transistor 72 and transistor 74 conduct and couple *MAGHIT02 to MVGND2, providing a low or inactive signal. Otherwise, *MAGHIT02 remains in a high impedance state. By such a method of generating *MAGHIT02, several cells comprising a column can tie their output signals together on output line 28 in a wired-OR fashion. The only requirement is that sense amplifier 26 provide a pull-up mechanism on output line 28 to provide *MAGHIT2.

In enable carry portion 80, OR gate 88 performs a logical OR function on BIT02 and feedback signal *BMHIT2. NAND gate 86 and inverter 84 of AND gate portion 82 receive the output of OR gate 88 and together perform an AND operation between the output of OR gate 88 and enable signal SELECT0, providing enable carry signal ENCAR02. While a NAND gate and an inverter were used to implement an AND function in the present embodiment, other variations are possible. If cell 22 were the rightmost cell in an array, ENCAR02 would instead be called PRIORITY0 and would indicate whether row 12 of FIG. 1 contains the highest value.

In another embodiment, comparator 10 of FIG. 1 could be used to determine a lowest register value. The output terminal of inverter 68, supplying *BIT02, instead of BIT02, could be supplied to the gate of transistor 74 and the first input terminal of OR gate 88. Additionally, BITMAG2, BITMAG1, and BITMAG0 must be inverted to indicate the lowest register value. By now it should be apparent that binary magnitude comparator 10 of FIG. 1 provides a fast comparison of values stored in registers by performing the comparison asynchronously, without clocking between successive columns or bit positions. In addition, comparator 10 of FIG. 1, using comparator cells like cell 22 of FIG. 2, can be expanded to an arbitrary size, with registers of arbitrary bit lengths, without substantial re-design.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

We claim:

1. A binary magnitude comparator cell for performing a comparison of a data output signal to a predetermined logic state in response to an enable input signal, comprising:

data storage means, for providing the data output signal in response to a logic state of a data input signal during a predetermined time period;

enable carry means coupled to the data storage means, for receiving the enable input signal, the data output signal, and a feedback signal, said enable input signal enabling a binary magnitude comparison, and for providing an enable carry signal, said enable carry signal provided in response to predetermined logic values of the enable input signal, the data output signal, and the feedback signal; and output drive means coupled to the data storage means, for receiving the data output signal and the enable input signal, and for comparing the data output signal with the predetermined logic state to provide a compare output signal in response to both the data output signal and a predetermined logic value of the enable input signal.

2. The binary magnitude comparator cell of claim 1, wherein the enable carry means provides said enable carry signal at a first logic state if the enable input signal and either the data output signal or the feedback signal are at the first logic state, and wherein the output drive means provides said compare output signal at a second logic state if the enable input signal and the data output signal are at the first logic state, or at a high impedance state otherwise.

3. The binary magnitude comparator cell of claim 2, wherein said enable carry means comprises:

OR gate means, for receiving the data output signal and the feedback signal, and for providing an intermediate output signal having a logic state equal to the logical OR of the data output signal and the feedback signal; and AND gate means, coupled to the OR gate means, for receiving the enable input signal and the intermediate output signal of said OR gate, and for providing the carry output signal having a logic state equal to the logical AND of the enable input signal and the intermediate signal.

4. The binary magnitude comparator cell of claim 2, wherein said output drive means comprises:

a first transistor, having a first current electrode for providing the compare output signal, a control electrode coupled to the enable input signal, and a second current electrode; and a second transistor, having a first current electrode coupled to the second current electrode of the first transistor, a control electrode coupled to the data output signal, and a second current electrode coupled to a negative power supply voltage terminal.

5. A binary magnitude comparator, for receiving a plurality of select signals, and for providing a plurality of first output signals and a plurality of second output signals, comprising a plurality of columns, including a most significant column and a least significant column, each of said plurality of columns having an interconnect line and receiving a plurality of enable input signals, and providing one of said plurality of first output signals, and providing a plurality of enable carry signals, each column comprising:

a sense amplifier coupled to the interconnect line, for comparing a voltage on the interconnect line with a first predetermined logic state, and providing said one of the plurality of first output signals in response thereto; and a plurality of binary magnitude comparator cells, each of said plurality of binary magnitude comparator cells receiving one of said plurality of enable input signals, and providing one of said plurality of enable carry signals, and providing a voltage on said interconnect line in response to said one of said plurality of enable input signals and to a comparison of a logic state of a memory bit associated therewith and a second predetermined logic state;

wherein for all columns except the least significant column, the plurality of enable carry signals of a column provides the plurality of enable input signals of a next most significant column, wherein said plurality of select signals provides the plurality of enable input signals for the most significant column, and wherein the enable carry signals of the least significant column form the plurality of second output signals.

6. A binary magnitude comparator having a plurality of rows and a plurality of columns, including a most significant column and a least significant column, comprising:

a plurality of rows and columns of comparator cells, each of said plurality of comparator cells storing a data bit and comparing the stored data bit with a predetermined logic state to provide a first output signal, said data bit being in either a first logic state or a second logic state, and the first output signal being in the first logic state when an enable input signal coupled thereto is in the second logic state, and providing the first output signal in a high impedance state otherwise, and for providing an enable carry bit in the second logic state if either said stored data bit or a feedback signal are in the second logic state, and the enable input signal is in the second logic state, and otherwise providing the enable carry bit in the first logic state; and sense amplifier means, coupled to the plurality of comparator cells, for receiving the first output signal from each of said plurality of comparator cells, for providing a second output signal, a bit of said second output signal associated with each of said plurality of columns, provided in the second logic state if any of said plurality of comparator cells in a column provides the first output signal in the first logic state, and provided in the first logic state otherwise, and for providing the feedback signal in the second logic state if all of the first output signals are in the first logic state, wherein for all columns except the least significant column a plurality of enable carry signals of the column provides a plurality of enable input signals of a next most significant column, wherein for all columns except the most significant column the plurality of enable input signals of the column are formed by the plurality of enable carry signals of a next least significant column, and wherein the plurality of enable input signals of the most significant column are formed by a plurality of select signals.

7. In an array of memory cells having a plurality of rows and a plurality of columns, including a most significant column and a least significant column, wherein each memory cell is located at an intersection of one of said plurality of rows and one of said plurality of columns, a method of determining a highest binary value among at least one selected row of the plurality of rows, comprising the steps of:

selecting at least one row by enabling a memory cell in the most significant column in the at least one row;

comparing a stored bit in the memory cell with a first logic state;

providing a first output signal for each column in the first logic state if the stored bit of any enabled memory cells in each column is in the first logic state;

enabling a memory cell in a next most significant column of a corresponding row of an enabled memory cell if the stored bit of the memory cell is at the first logic value or if no enabled memory cells in the column are at the first logic value;

continuing said steps of comparing a stored bit, providing a first signal, and enabling a memory cell for each column until the least significant column; and providing a plurality of second output signals, each of said plurality of second output signals associated with one of said plurality of rows, and each of said plurality of second output signals at the first logic state if a corresponding memory cell in the least significant column is enabled and a stored bit of the corresponding memory cell is in the first logic state, or if no other enabled memory cells in the least significant column are in the first logic state, and in a second logic state otherwise.

* * * * *